(12) United States Patent
Tsuchiya et al.

(10) Patent No.: US 8,214,823 B2
(45) Date of Patent: Jul. 3, 2012

(54) CLUSTER SYSTEM, PROCESS FOR UPDATING SOFTWARE, SERVICE PROVISION NODE, AND COMPUTER-READABLE MEDIUM STORING SERVICE PROVISION PROGRAM

(75) Inventors: Yoshihiro Tsuchiya, Kawasaki (JP); Riichiro Take, Kawasaki (JP); Yasuo Noguchi, Kawasaki (JP); Kazutaka Ogihara, Kawasaki (JP); Masahisa Tamura, Kawasaki (JP); Tetsutaro Maruyama, Kawasaki (JP); Takashi Watanabe, Kawasaki (JP); Tatsuo Kumano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 499 days.

(21) Appl. No.: 12/553,760

(22) Filed: Sep. 3, 2009

(65) Prior Publication Data

US 2009/0328027 A1 Dec. 31, 2009

Related U.S. Application Data

(63) Continuation of application No. PCT/JP2007/057290, filed on Mar. 30, 2007.

(51) Int. Cl.
*G06F 9/44* (2006.01)
*G06F 15/173* (2006.01)
*G06F 15/177* (2006.01)
(52) U.S. Cl. ........ 717/171; 717/172; 717/176; 717/177; 709/221; 709/223; 709/224
(58) Field of Classification Search .................. None
See application file for complete search history.

(56) References Cited

U.S. PATENT DOCUMENTS

| 6,674,721 | B1 * | 1/2004 | Dittia et al. | 370/235 |
| 7,609,640 | B2 * | 10/2009 | Ahuja et al. | 370/236 |
| 2002/0100036 | A1 * | 7/2002 | Moshir et al. | 717/173 |
| 2005/0018706 | A1 * | 1/2005 | Myojo | 370/445 |
| 2005/0222969 | A1 * | 10/2005 | Yip et al. | 707/1 |

(Continued)

FOREIGN PATENT DOCUMENTS

JP A 6-250830 9/1994
(Continued)

OTHER PUBLICATIONS

Japanese office action issued in corresponding Japanese App. No. 2009-508865, issued Apr. 17, 2012.

*Primary Examiner* — Henry Tsai
*Assistant Examiner* — Michael Sun
(74) *Attorney, Agent, or Firm* — Greer, Burns & Crain, Ltd.

(57) ABSTRACT

In a cluster system: a heartbeat transmission unit in a service provision node transmits to a monitoring node a heartbeat packet which contains interval information indicating an interval greater than normal intervals at which normal heartbeat packets are transmitted, when an execution unit in the service provision node receives a stop command. Thereafter, when software realizing the execution unit is updated and the execution unit is restarted, the heartbeat transmission unit periodically transmits the normal heartbeat packets to the monitoring node at the normal intervals, where the normal heartbeat packets contain interval information indicating the normal intervals. A heartbeat monitoring unit in the monitoring node determines that the execution unit is in operation, while the monitoring node receives heartbeat packets at intervals indicated by the interval information stored in the monitoring node and updated with received interval information.

8 Claims, 13 Drawing Sheets

U.S. PATENT DOCUMENTS

2005/0234920 A1 * 10/2005 Rhodes .......................... 707/10

FOREIGN PATENT DOCUMENTS

| JP | 09-026926 | 1/1997 |
| JP | A 2000-307600 | 11/2000 |
| JP | 2002-152835 | 5/2002 |
| JP | 2003-102066 | 4/2003 |
| JP | A 2004-364168 | 12/2004 |
| JP | A 2004-364169 | 12/2004 |
| JP | A 2005-85114 | 3/2005 |
| JP | A 2005-267051 | 9/2005 |
| JP | A 2006-235668 | 9/2006 |
| JP | A 2006-323563 | 11/2006 |
| JP | A 2007-34666 | 2/2007 |

* cited by examiner

| 30 HEARTBEAT PACKET | | | | |
|---|---|---|---|---|
| SOURCE ADDRESS | DESTINATION ADDRESS | APPLICATION- IDENTIFICATION NUMBER | PACKET-TYPE IDENTIFIER (HEARTBEAT) | HEARTBEAT INTERVAL INFORMATION | ... |

FIG. 5

511 SERVER-STATUS TABLE

| SERVICE PROVISION NODE ADDRESS | APPLICATION-IDENTIFICATION NUMBER | HEARTBEAT INTERVAL | HEARTBEAT-RECEPTION TIME | STATUS |
|---|---|---|---|---|
| Node#1 | SW#1 | 10 SEC | 17:31:14 | OPERATING |
| | SW#2 | 120 SEC | 17:30:32 | OPERATING |
| Node#2 | SW#1 | 10 SEC | 17:31:08 | OPERATING |
| ... | ... | ... | ... | ... |

FIG. 6

CLUSTER SYSTEM, PROCESS FOR UPDATING SOFTWARE, SERVICE PROVISION NODE, AND COMPUTER-READABLE MEDIUM STORING SERVICE PROVISION PROGRAM

This application is a continuing application, filed under 35 U.S.C. Section 111(a), of International Application PCT/JP2007/057290, filed Mar. 30, 2007.

FIELD

The embodiments discussed herein relate to a cluster system performing distributed processing, a process for updating software in the cluster system, a service provision node for providing a service in the cluster system, and a computer-readable medium storing a program for realizing the service provision node.

BACKGROUND

In the cluster system, distributed processing is performed by using multiple computers. The computers constituting the cluster system are called nodes. In order to determine one or more nodes which are to execute processing in the cluster system, it is necessary to know whether or not each node is normally operating. In a method for keeping track of the operational status of each node in the cluster system, each node periodically transmits heartbeat signals to a monitoring node. The heartbeat signals indicate that each node which transmits the heartbeat signals is normally operating. A monitoring node recognizes that only one or more nodes which transmit the heartbeat signals at predetermined intervals are normally operating. When the monitoring node detects a node from which transmission of the heartbeat signals stops, the monitoring node determines that a trouble occurs in the node, and excludes the node from a group of destinations to which requests for processing can be transmitted. When the cause of the trouble is eliminated from the node excluded from the group of destinations to which requests for processing can be transmitted, the operation of the node is restarted. When the operation of the node is restarted, the monitoring node adds the node to the group of destinations to which requests for processing can be transmitted.

When the intervals between the periodically transmitted signals such as the heartbeat signals are small, the real-time performance is improved. However, the communication load increases. In a technique proposed for overcoming the above problem, the transmission intervals between periodical heartbeat signals are changed according to the communication condition. (See, for example, Japanese Laid-open Patent Publication No. 2004-364168.)

In addition, the necessity of updating software in each node can occur during system operation. Normally, the software updating is performed after the operation of the node in which the software update is to be performed is stopped. Therefore, the service provision is temporarily stopped when the software update is performed. When the service provision is stopped, the monitoring node detects the stop of the service provision as a failure, and performs error processing. However, the node in which software is updated can normally operate after completion of the software update. Therefore, the error processing is an useless operation, and lowers the operational efficiency of the system.

In order to overcome the above problem, some techniques for updating software without stopping the service provision have been proposed. For example, according to one of such techniques, an agent for providing a service and a cluster controller for controlling the agent by performing communication with other computers in a cluster system are arranged in the cluster system, and software in the agent controller is updated while the service provision by the agent continues. (See, for example, Japanese Laid-open Patent Publication No. 2005-85114.)

Nevertheless, even in the case where the technique disclosed in Japanese Laid-open Patent Publication No. 2005-85114 is used, the service provision is required to be stopped when the software in the agent (for service provision) is updated. When the service provision by a node is stopped, transmission of the heartbeat signals from the node is also stopped, so that the monitoring node recognizes that some trouble occurs in the node, and then excludes the node in which the trouble occurs from the group of nodes which provide services. Thereafter, when the software update in the excluded node is completed, the monitoring node performs processing for adding the node to the group of nodes which provide services. Therefore, the service provision is stopped after the node is stopped until the node is added to the group. Since, every time software in a node is updated, the node is excluded from the group of nodes which provide services, and is added to the group after the software update is completed, the duration for which the service provision is stopped becomes long. In particular, when software in all the nodes constituting a large-scale cluster system is updated, the processing for exclusion and addition of the nodes for software update lowers the operational efficiency of the entire system.

SUMMARY

According to an aspect of the present invention, a cluster system performing distributed processing by use of a plurality of servers is provided. The cluster system comprises a service provision node and a monitoring node. The service provision node includes an execution unit and a heartbeat transmission unit. The execution unit executes processing according to a processing request when the service provision node receives the processing request, and stops operation of the execution unit when the execution unit receives a command to stop the execution unit. The heartbeat transmission unit periodically transmits first heartbeat packets containing interval information to the monitoring node at first intervals when the execution unit is in operation, transmits a second heartbeat packet containing interval information to the monitoring node when the heartbeat transmission unit receives the command to stop the execution unit, and restarts periodical transmission of the first heartbeat packets when the execution unit is restarted, where the interval information contained in the first heartbeat packets indicates the first intervals, and the interval information contained in the second heartbeat packet indicates a second interval greater than the first intervals. The monitoring node includes an interval storage, an interval updating unit, and a heartbeat monitoring unit. The interval storage stores in correspondence with the service provision node the interval information contained in the first heartbeat packets or the second heartbeat packet. The interval updating unit receives each of the first heartbeat packets and the second heartbeat packet transmitted from the service provision node, and updates the interval information stored in the interval storage in correspondence with the service provision node, with the interval information contained in the heartbeat packet when the interval information contained in the heartbeat packet is different from the interval information stored in the interval storage in correspondence with the service provision node. The heartbeat monitoring unit determines that the execution unit is in operation, while the monitoring node receives the first heartbeat packets and the second heartbeat packet at intervals indicated by the interval information stored in the interval storage in correspondence with the service provision node.

The objects and advantages of the invention will be realized and attained by means of the elements and combinations particularly pointed out in the claims.

It is to be understood that both the forgoing general description and the following detailed description are exemplary and explanatory and are not restrictive of the invention, as claimed.

BRIEF DESCRIPTION OF THE DRAWING(S)

FIG. 5 is a diagram illustrating an exemplary data structure of a heartbeat packet;

FIG. 6 is a diagram illustrating an exemplary data structure of a server-status table;

DESCRIPTION OF EMBODIMENT(S)

Preferred embodiments of the present invention will be described below with reference to the accompanying drawings.

Representative Functions

Figure 1:
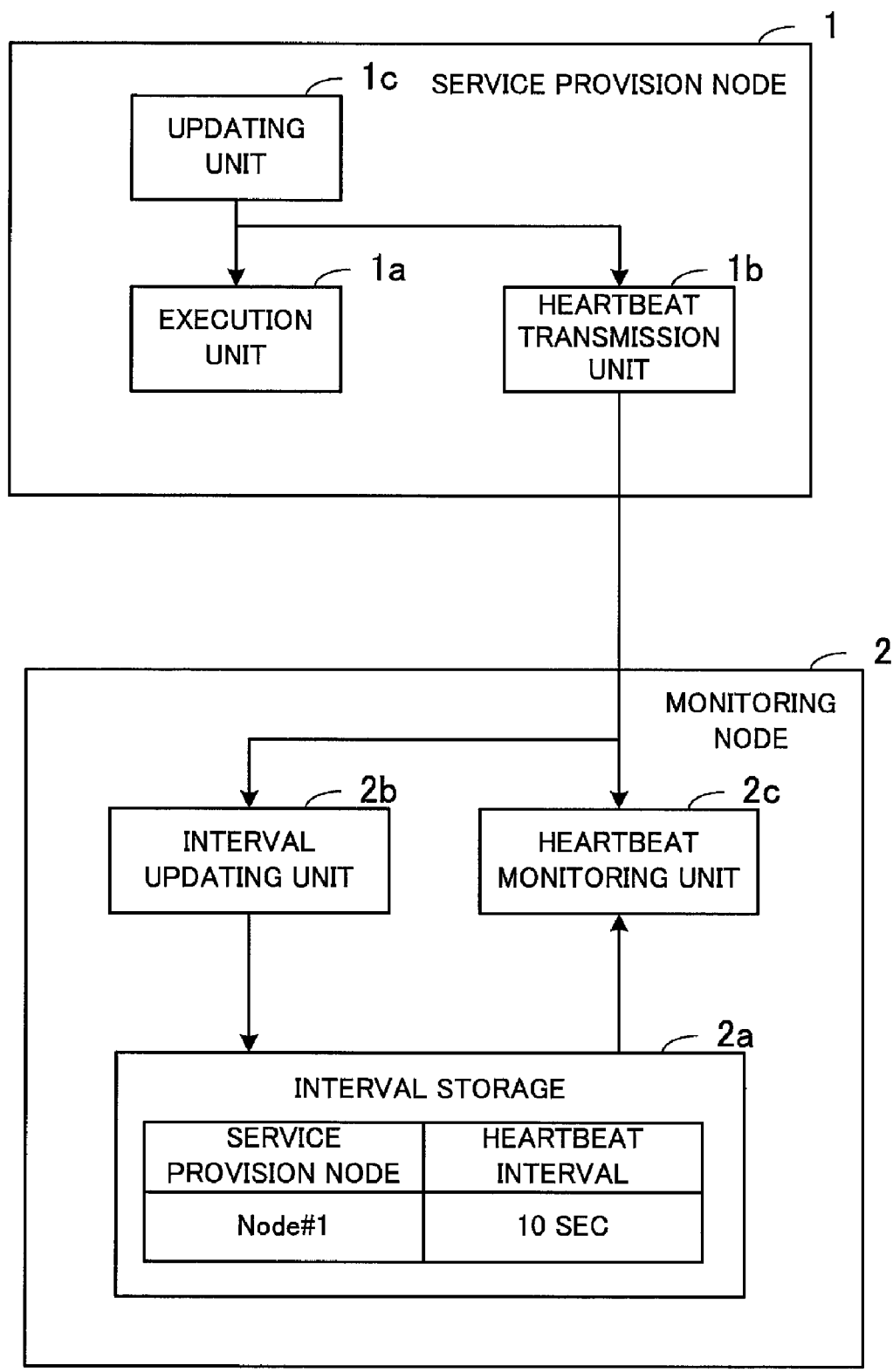
FIG. 1 is a diagram illustrating representative functions of a typical cluster system disclosed in the present patent application.

FIG. 1 is a diagram illustrating representative functions of a typical cluster system disclosed in the present patent application. The cluster system illustrated in FIG. 1 comprises a service provision node 1 and a monitoring node 2. The service provision node 1 comprises an execution unit 1a, a heartbeat transmission unit 1b, and an updating unit 1c. The monitoring node 2 comprises an interval storage 2a, an interval updating unit 2b, and a heartbeat monitoring unit 2c.

The execution unit 1a executes processing according to a processing request when the service provision node 1 receives the processing request. In addition, the execution unit 1a stops the operation of the execution unit 1a when the execution unit 1a receives a command to stop the execution unit 1. While the execution unit 1a is in operation, the heartbeat transmission unit 1b periodically transmits to the monitoring node 2 at first intervals first heartbeat packets which contain interval information indicating the first intervals. In addition, when the heartbeat transmission unit 1b receives the command to stop the execution unit 1a, the heartbeat transmission unit 1b transmits to the monitoring node 2 a heartbeat packet which contains interval information indicating a second interval, and the second interval is greater than the first intervals. The second interval corresponds to the time necessary for updating software in the service provision node 1. Further, when the execution unit 1a is restarted, the heartbeat transmission unit 1b periodically transmits to the monitoring node 2 at the first intervals the first heartbeat packets which contain the interval information indicating the first intervals.

The updating unit 1c outputs to the execution unit 1a and the heartbeat transmission unit 1b the command to stop the execution unit 1a when the service provision node 1 receives a request to update the software which realizes the functions of the execution unit 1a. In addition, after the execution unit 1a stops the operation, the updating unit 1c updates the software according to the request to update the software. When the update of the software is completed, the updating unit 1c restarts the execution unit 1a realized by the updated software.

The interval storage 2a stores the interval information contained in the first heartbeat packets or the second heartbeat packet, in correspondence with the service provision node 1. In addition, the interval updating unit 2b receives the first heartbeat packets or the second heartbeat packet transmitted from the service provision node 1, and determines whether or not the interval information contained in the received heartbeat packets is identical to the interval information stored in the interval storage 2a in correspondence with the service provision node 1. When no is determined, the interval updating unit 2b updates the interval information stored in the interval storage 2a in correspondence with the service provision node 1, with the interval information contained in the received heartbeat packets. The heartbeat monitoring unit 2c monitors the intervals at which the heartbeat packets are transmitted from the service provision node 1. While the monitored intervals are identical to the intervals indicated by the interval information stored in the interval storage 2a in correspondence with the service provision node 1, the heartbeat monitoring unit 2c determines that the execution unit 1a is in operation. When the heartbeat monitoring unit 2c does not receive a heartbeat packet even after the time indicated by the interval information stored in the interval storage 2a in correspondence with the service provision node 1 elapses since the preceding heartbeat packet is received, the heartbeat monitoring unit 2c performs error processing.

In the cluster system having the above functions, while the execution unit 1a is in operation, every time the execution unit 1a receives a processing request, the execution unit 1a in the service provision node 1 executes processing according to the received processing request. While the execution unit 1a is in operation, the heartbeat transmission unit 1b periodically transmits to the monitoring node 2 at the first intervals heartbeat packets which contain the interval information indicating the first intervals. While the heartbeat monitoring unit 2c in the monitoring node 2 receives the heartbeat packets from the service provision node 1 at the intervals indicated by the interval information stored in the interval storage 2a in correspondence with the service provision node 1, the heartbeat monitoring unit 2c recognizes that the execution unit 1a is in operation.

When the service provision node 1 receives a request to update the software realizing the functions of the execution unit 1a, the updating unit 1c outputs to the execution unit 1a and the heartbeat transmission unit 1b a command to stop the execution unit 1a. Then, the heartbeat transmission unit 1b transmits to the monitoring node 2 a heartbeat packet which contains the interval information indicating the second interval, so that the interval updating unit 2b in the monitoring node 2 receives the heartbeat packet from the service provision node 1, and updates the interval information stored in the interval storage 2a in correspondence with the service provision node 1, with the interval information being contained in the received heartbeat packet and indicating the second interval. Thereafter, the execution unit 1a stops the operation in accordance with the command to stop the execution unit 1a. When the operation of the execution unit 1a stops, the updating unit 1c updates the software realizing the functions of the execution unit 1a, in accordance with the request to update the software, and then restarts the execution unit 1a realized by the updated software.

When the execution unit 1a is restarted, the heartbeat transmission unit 1b periodically transmits to the monitoring node 2 at the first intervals heartbeat packets which contain the interval information indicating the first intervals. While the heartbeat monitoring unit 2c in the monitoring node 2 receives the heartbeat packets from the service provision node 1 at the intervals indicated by the interval information stored in the interval storage 2a in correspondence with the service provision node 1, the heartbeat monitoring unit 2c recognizes that the execution unit 1a is in operation.

Therefore, when the update of the software in the execution unit 1a is completed within the time corresponding to the second interval, the monitoring node 2 recognizes that the normal operation of the execution unit 1a has continued through the time in which the software of the execution unit 1a is updated. Thus, it is possible to prevent occurrence of the error processing by the monitoring node 2, and suppress the lowering of the operational efficiency of the cluster system (which can be conventionally caused by the update of the software) as much as possible.

In the example of FIG. 1, the updating unit 1c outputs to the execution unit 1a the command to stop the operation of the execution unit 1a, and the update of the software is automatically performed. However, the command to stop the operation of the execution unit 1a may be manually inputted to the execution unit 1a by a system administrator. In addition, the update of the software may be realized by a file operation based on a manual input by the system administrator. The file operation is, for example, copying from a file stored in a CD-ROM (Compact Disk-Read Only Memory). Further, information indicating the second interval may be attached to the command to stop the execution unit 1a, and set to the time necessary for updating the software.

In the cluster system explained above with reference to FIG. 1, while the monitoring node receives the heartbeat packets at the first heartbeat intervals, the monitoring node recognizes that the execution unit 1a is in operation. When a command to stop the execution unit 1a is sent to the execution unit 1a, a heartbeat packet which contains the heartbeat interval information indicating the second heartbeat interval (greater than the first heartbeat intervals) is transmitted to the monitoring node. Then, the operation for updating the software is performed during the increased heartbeat interval. Thus, it is possible to update the software without detection of an error by the monitoring node.

Details of Embodiment

Although FIG. 1 indicates only the functions for preventing occurrence of an error in the monitoring node 2, the cluster system further comprises a node which outputs the processing request to the service provision node 1, and is hereinafter referred to as a processing request node. It is desirable to also prevent occurrence of an error in the processing request node while the execution unit 1a is stopped. This is because, in some cases, other processing in the source of the processing request can be suspended when an error is detected by the processing request node, and the suspension of the processing continues until the system administrator manually inputs an instruction to restart the suspended processing, so that the operational efficiency of the system is lowered. Therefore, an embodiment explained below in detail is a cluster system in which update of software is performed so that occurrence of an error can be prevented in both of the monitoring node and the processing request node.

System Configuration

Figure 2:
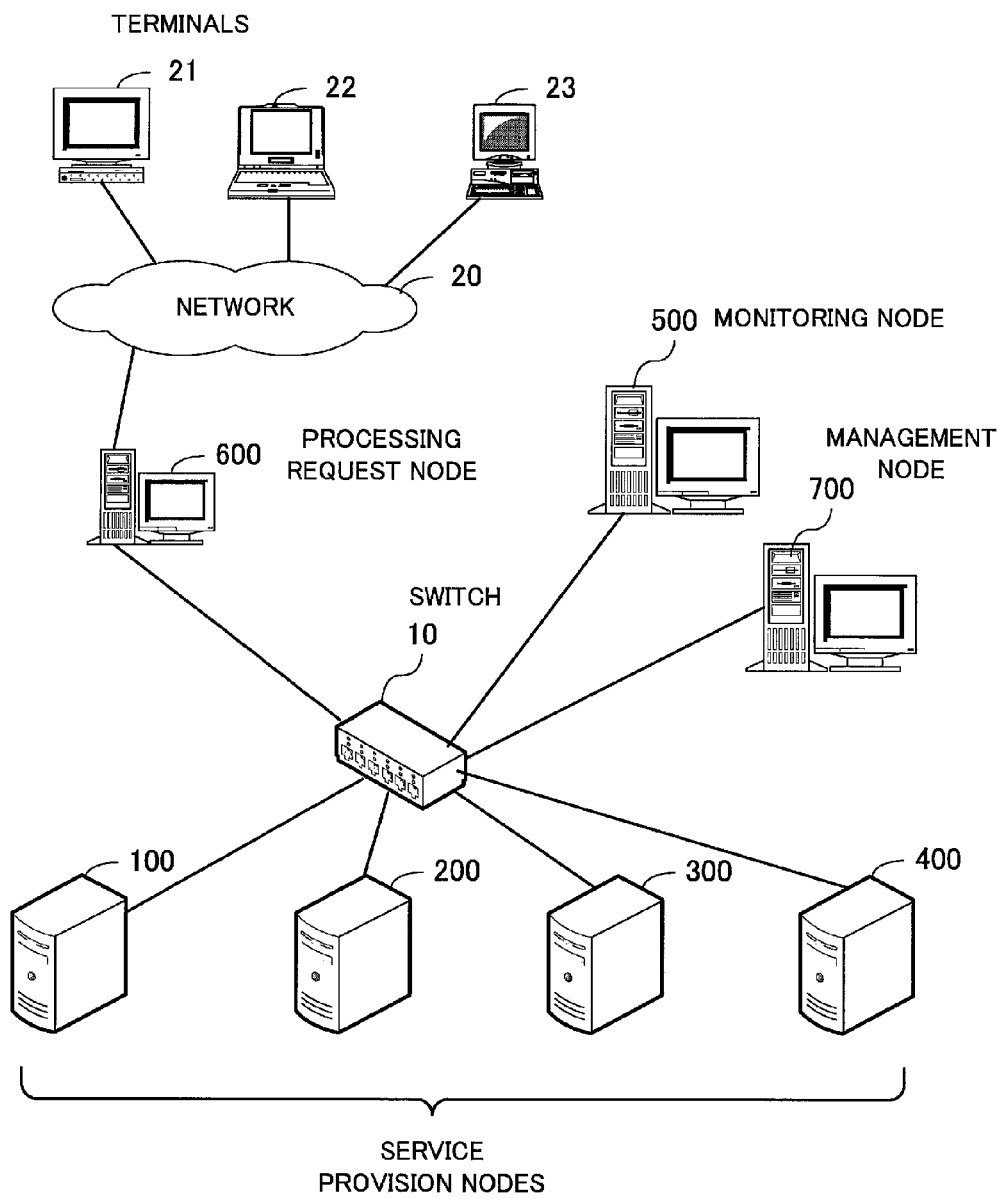
FIG. 2 is a diagram illustrating an exemplary configuration of a cluster system according to an embodiment.

FIG. 2 is a diagram illustrating an exemplary configuration of the cluster system according to the embodiment. In the example of FIG. 2, a plurality of service provision nodes 100, 200, 300, and 400, a monitoring node 500, a processing request node 600, and a management node 700 are connected through a switch 10.

The service provision nodes 100, 200, 300, and 400 are, for example, computers having the so-called Intel architecture. The service provision nodes 100, 200, 300, and 400 have functions for executing data processing according to a processing request by using application software. Hereinafter, a set of the above functions for executing data processing according to a processing request by using application software is referred to as a server. The server implemented in each of the service provision nodes 100, 200, 300, and 400 has a function of periodically transmitting heartbeat signals to the monitoring node 500. The transmission intervals between the heartbeat signals can be arbitrarily changed. When the transmission intervals between the heartbeat signals transmitted from each of the service provision nodes 100, 200, 300, and 400 is changed, the service provision node transmits to the monitoring node 500 interval information indicating the changed intervals between the heartbeat signals.

The monitoring node 500 controls the service provision nodes 100, 200, 300, and 400. For example, the monitoring node 500 receives the heartbeat signals transmitted from each of the service provision nodes 100, 200, 300, and 400, and recognizes one or more of the service provision nodes 100, 200, 300, and 400 which are concurrently in normal operation. Specifically, the monitoring node 500 waits for heartbeat signals from each of the service provision nodes 100, 200, 300, and 400 at individual intervals based on the interval information which is transmitted from each of the service provision nodes 100, 200, 300, and 400 and indicates the transmission intervals between the heartbeat signals transmitted from the service provision node. When the transmission of the heartbeat signals from one of the service provision nodes 100, 200, 300, and 400 at the intervals indicated by the corresponding interval information stops, the monitoring node 500 recognizes occurrence of a trouble in the service provision node.

The processing request node 600 is connected to a plurality of terminals 21, 22, and 23 through a network 20. The processing request node 600 is informed of the location of data managed by each of the service provision nodes 100, 200, 300, and 400, and performs data access to the service provision nodes 100, 200, 300, and 400 according to requests from the terminals 21, 22, and 23.

The management node 700 is a computer which manages the entire cluster system. For example, the management node 700 transmits to each of the service provision nodes 100, 200, 300, and 400 a request to update software in each server.

Hardware

Figure 3:
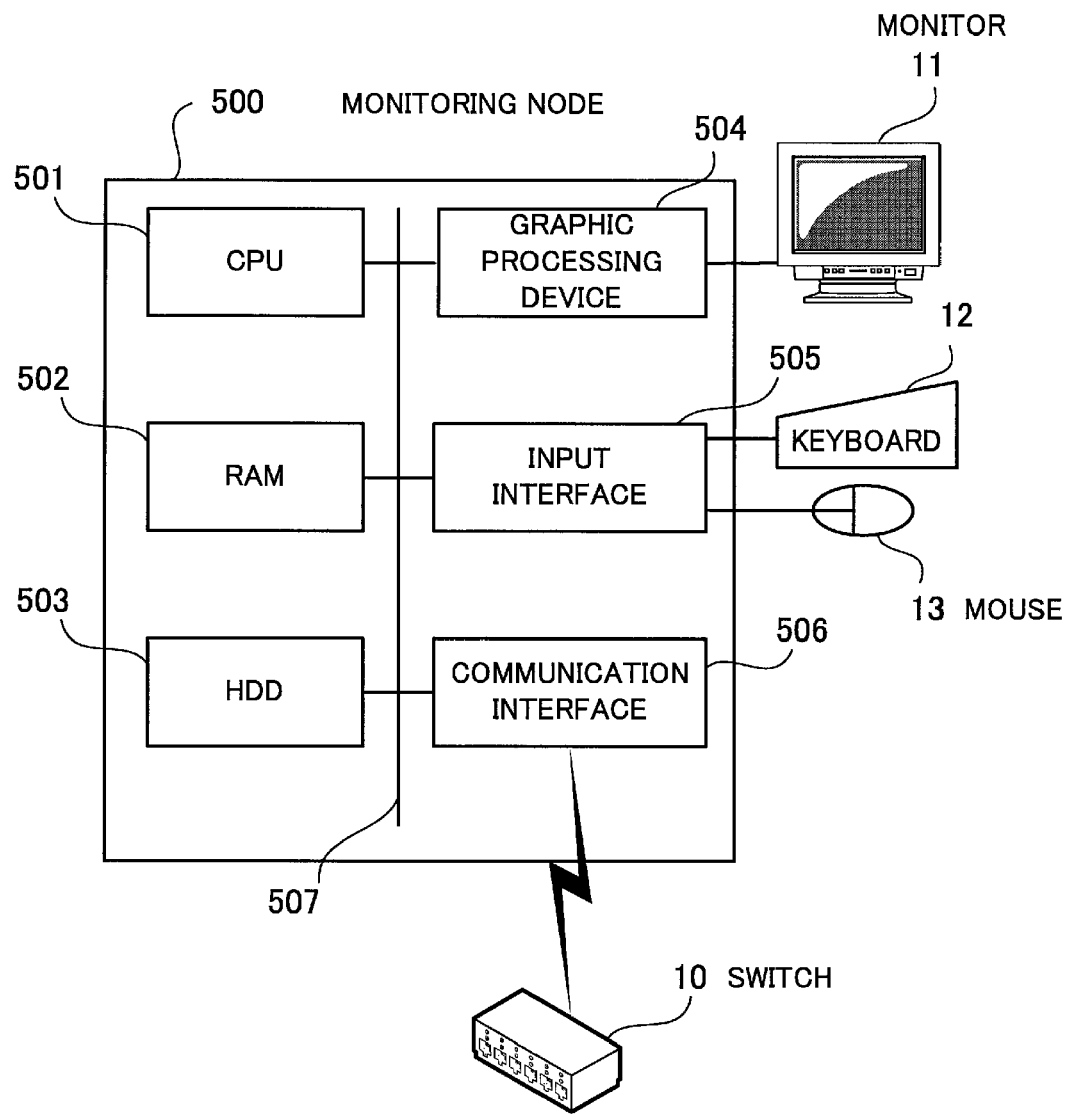
FIG. 3 is a diagram illustrating an exemplary hardware construction of a monitoring node according to the embodiment.

FIG. 3 is a diagram illustrating an exemplary hardware construction of the monitoring node according to the embodiment. The monitoring node 500 is controlled by a CPU (central processing units) 501, to which a RAM (random access memory) 502, an HDD (hard disk drive) 503, a graphic processing device 504, an input interface 505, and a communication interface 506 are connected through a bus 507. The RAM 502 temporarily stores at least portions of an OS (operating system) program and application programs which are executed by the CPU 501 as well as various types of data necessary for processing by the CPU 501. The HDD 503 stores the OS program and the application programs. A monitor 11 is connected to the graphic processing device 504, which makes the monitor 11 display an image on a screen in accordance with an instruction from the CPU 501. A keyboard 12 and a mouse 13 are connected to the input interface 505, which transmits signals sent from the keyboard 12 and the mouse 13, to the CPU 501 through the bus 507. The communication interface 506 is connected to the switch 10, and exchanges data with other computers through the switch 10.

In addition, each of the service provision nodes 100, 200, 300, and 400, the management node 700, and the terminals 21, 22, and 23 can also be realized by a hardware construction similar to the monitoring node 500. By using the above hardware construction, it is possible to realize the functions of the present embodiment.

Functions of Cluster System

Figure 4:
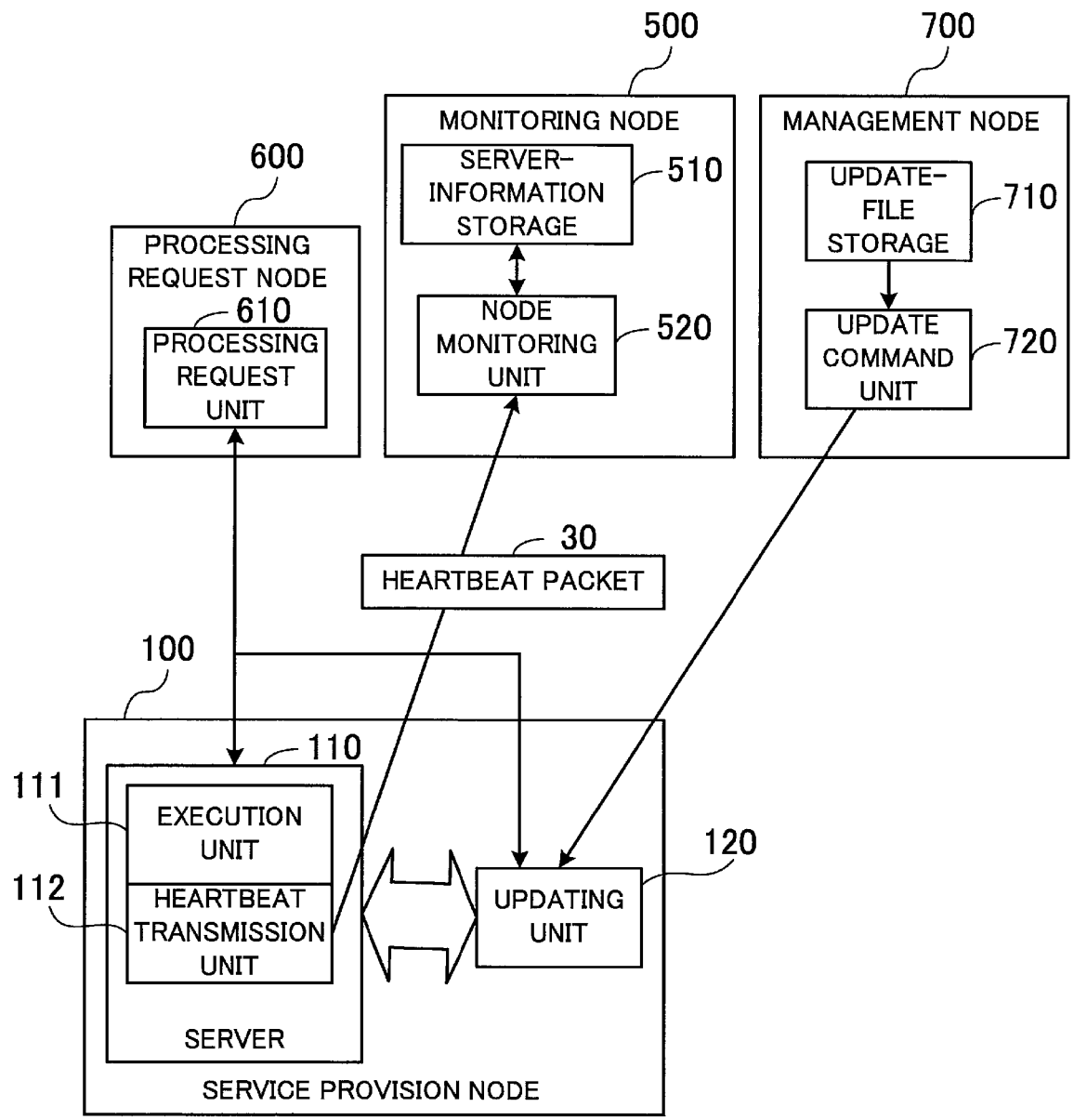
FIG. 4 is a block diagram illustrating functions of a distributed processing system according to the embodiment.

FIG. 4 is a block diagram illustrating representative functions which the cluster system (distributed processing system) according to the embodiment has. Although only the service provision node 100 is indicated as a representative of the service provision nodes 100, 200, 300, and 400 in FIG. 4, each of the other service provision nodes has similar functions to the service provision node 100.

As illustrated in FIG. 4, the service provision node 100 comprises a server 110 and an updating unit 120. The server 110 is a set of processing functions (one or more processes) for service provision. Specifically, the functions of the server 110 are realized when the service provision node 100 executes server software. The server 110 comprises an execution unit 111 and a heartbeat transmission unit 112. The execution unit 111 executes according to a processing request transmitted from the processing request node 600, and then transmits to the processing request node 600 a processing result as a response to the processing request. The heartbeat transmission unit 112 periodically transmits heartbeat packets 30 to the monitoring node 500. At this time, the heartbeat transmission unit 112 informs the monitoring node 500 of the transmission intervals between the heartbeat packets 30 by inserting into the heartbeat packets 30 (heartbeat) interval information indicating the transmission intervals between the heartbeat packets. The initial value of the transmission intervals between the heartbeat packets 30 is predetermined, and can be changed, for example, by designation by the updating unit 120.

The updating unit 120 updates the software which realizes the functions of the server 110 according to a request to update the software, which is received from the management node 700 or the like. The processing for updating the software is executed after the operation of the server 110 is stopped. Therefore, when the updating unit 120 receives the request to update the software, the updating unit 120 issues to the server 110 a command to stop the server 110. At this time, a parameter indicating increase in the (heartbeat) intervals is attached to the command to stop the server 110. Thus, it is possible to make the server 110 increase the (heartbeat) intervals and thereafter stop the operation of the server 110.

In addition, when the processing request node 600 issues a processing request to the server 110 while the server 110 is stopped for updating the software, the updating unit 120 receives the processing request, and transmits to the processing request node 600 a response to the processing request. In this case, the response transmitted from the updating unit 120 contains information indicating that the process is busy.

When the processing for updating the software is completed, the updating unit 120 starts the server 110 realized by the updated version of the software.

The monitoring node 500 comprises a server-information storage 510 and a node monitoring unit 520. The server-information storage 510 stores a data table indicating the operational status of the server implemented in each of the service provision nodes 100, 200, 300, and 400, and the operational status of the server implemented in each of the service provision nodes 100, 200, 300, and 400 indicates whether or not the server is in operation. (Hereinafter, the above data table is referred to as a server-status table.) For example, part of the storage area of the RAM 502 in the monitoring node 500 can be used as the server-information storage 510.

The processing request node 600 comprises a processing request unit 610. The processing request unit 610 transmits to one of the service provision nodes 100, 200, 300, and 400 a processing request transmitted from one of the terminals 21, 22, and 23 through the network 20. For example, the processing request node 600 acquires from each of the service provision nodes 100, 200, 300, and 400 load information indicating the load currently imposed on each service provision node, and the processing request unit 610 transmits the processing request to one of the service provision nodes 100, 200, 300, and 400 on which the minimum load is currently imposed. In addition, when the service provision node to which the processing request is transmitted returns a response, the processing request unit 610 transmits the response to the terminal which outputs the processing request.

The management node 700 comprises an update-file storage 710 and an update command unit 720. The update-file storage 710 stores one or more update files (including one or more program files) for use in updating of the software realizing the server 110. For example, part of the storage area of the hard disk drive (HDD) in the management node 700 can be used as the update-file storage 710. The update command unit 720 transmits to all or part of the service provision nodes 100, 200, 300, and 400 a request to update the software in each service provision node. At this time, the update command unit 720 acquires one or more update files from the update-file storage 710, and transmits to each service provision node the one or more update files together with the request to update the software.

In the cluster system (distributed processing system) having the above functions, undesirable detection of a failure by the monitoring node 500 can be prevented by increasing the transmission intervals between the heartbeat packets 30 when the software realizing the server 110 in each service provision node is updated.

Heartbeat Packet

FIG. 5 is a diagram illustrating an exemplary data structure of the heartbeat packet. As indicated in FIG. 5, the heartbeat packet 30 has the fields "Source Address," "Destination Address," "Application ID," "Packet-type ID," and "Heartbeat Interval."

An address for uniquely identifying on a network a service provision node which transmits the heartbeat packet 30 is set as a source address in the field "Source Address." For example, an IP address of the service provision node is set as the source address. An address for uniquely identifying on the network the monitoring node 500 as the destination of the heartbeat packet 30 is set as a destination address in the field "Destination Address." For example, an IP address of the monitoring node 500 is set as the destination address. The fields "Source Address" and "Destination Address" are contained in the header of the heartbeat packet 30. An identification number for uniquely identifying by the monitoring node 500 the type of the server 110 which outputs the heartbeat packet 30 is set as an application-identification number in the field "Application ID." For example, a communication port number of the server 110 may be set as the destination address. An identifier indicating that the heartbeat packet 30 is a packet for transmitting a heartbeat signal is set as a packet-type identifier in the field "Packet-type ID," and a value (in seconds) of the transmission intervals between heartbeat packets is set as the heartbeat interval in the field "Heartbeat Interval."

Server-Status Table

When the monitoring node 500 receives from each server a heartbeat packet 30 having the above data structure, the monitoring node 500 records the operational status of each server based on the received heartbeat packet, in the aforementioned server-status table in the server-information storage 510.

FIG. 6 is a diagram illustrating an exemplary data structure of the server-status table. The server-status table 511 has the columns "service provision node Address," "Application ID," "Heartbeat Interval," "Heartbeat-reception Time," and "Status."

The address of each of the service provision nodes 100, 200, 300, and 400 (which are connected to the monitoring node 500 through the switch 10) is set in the column "service provision node Address," and the application-identification number of the server implemented in each of the service provision nodes 100, 200, 300, and 400 is set in the column "Application ID." A value (in seconds) of the transmission intervals between heartbeat packets is set in the column "Heartbeat Interval" on the basis of the (heartbeat) interval information contained in the heartbeat packet 30. The time at which the monitoring node 500 receives the heartbeat packet 30 from the server corresponding to each application-identification number is set as the heartbeat-reception time in the column "Heartbeat-reception Time." The time which elapses since the latest heartbeat-reception time can be obtained by calculating the difference between the current time and the latest heartbeat-reception time stored in the column "Heartbeat-reception Time."

The status information indicating whether or not the server corresponding to each application-identification number is currently in operation is set in the column "Status." While heartbeat packets are transmitted from a server at intervals indicated by the (heartbeat) interval information stored in the server-status table 511, the node monitoring unit 520 determines that the server is in operation. When transmission of a heartbeat packet from the server stops, the node monitoring unit 520 determines that a trouble occurs in the server, so that status information indicating occurrence of a trouble is set in the column "Status" in the server-status table 511.

Processing
Change of Transmission Interval

Hereinbelow, processing for changing the transmission intervals between the heartbeat packets when the software is updated is explained.

Figure 7:
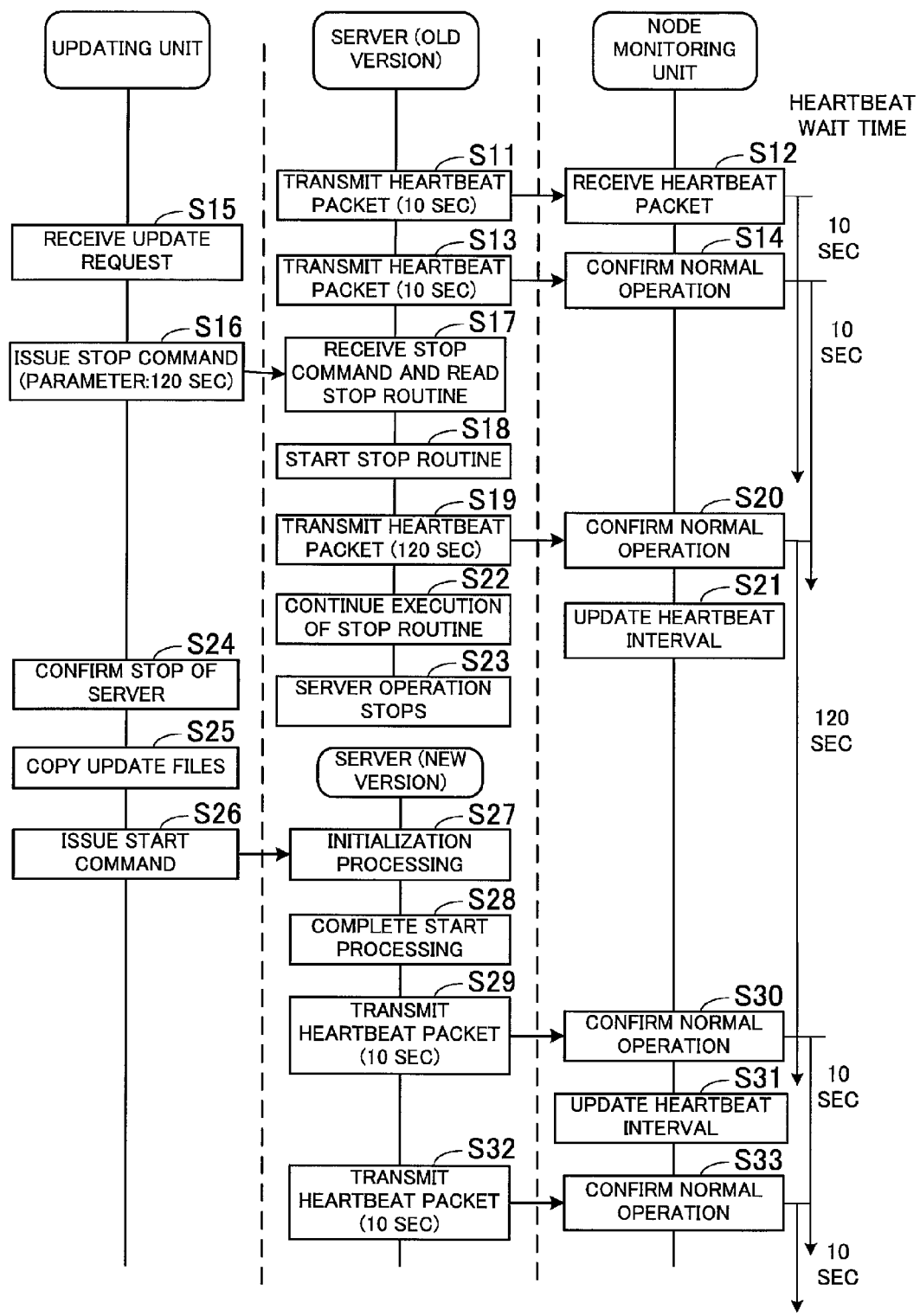
FIG. 7 is a sequence diagram indicating a sequence of processing for changing the transmission intervals between heartbeat packets when software is updated.

FIG. 7 is a sequence diagram indicating a sequence of processing for changing the transmission intervals between heartbeat packets when software is updated. The processing of FIG. 7 is explained below step by step.

<Step S11> While the server 110 realized in the service provision node 100 is in operation, the heartbeat transmission unit 112 in the server 110 transmits heartbeat packets 30 at transmission intervals corresponding to a value preset as a default value. In this example, it is assumed that the default value of the transmission intervals is 10 seconds.

<Step S12> The node monitoring unit 520 in the monitoring node 500 receives the heartbeat packets 30, and then sets the current time in the column "Heartbeat-reception Time" in the server-status table 511 in correspondence with the server 110.

<Step S13> Before ten seconds elapse since transmission of the last heartbeat packet, the heartbeat transmission unit 112 transmits a subsequent heartbeat packet.

<Step S14> The node monitoring unit 520 receives the heartbeat packet transmitted in step S13. Because, at this time, the time indicated in the column "Heartbeat Interval" in the server-status table 511 does not yet elapse since the server-information storage 510 receives the preceding heartbeat packet, the node monitoring unit 520 recognizes that the server 110 is normally operating. In addition, the node monitoring unit 520 updates with the current time the heartbeat-reception time stored in correspondence with the server 110 in the column "Heartbeat-reception Time" in the server-status table 511.

<Step S15> The updating unit 120 in the service provision node 100 receives an update request from the management node 700.

<Step S16> The updating unit 120 issues a stop command to the server 110, to which a parameter instructing to increase the heartbeat interval is attached. In the example of FIG. 7, it is assumed that the parameter instructs to increase the heartbeat interval to 120 seconds.

<Step S17> The server 110 reads out of the RAM a stop routine (including a stop instruction and instructions for processing for changing the heartbeat intervals).

<Step S18> The server 110 starts the stop routine.

<Step S19> The heartbeat transmission unit 112 in the server 110 transmits a heartbeat packet to the monitoring node 500. At this time, the heartbeat packet contains heartbeat interval information for changing the transmission intervals between the heartbeat packets to 120 seconds.

<Step S20> The node monitoring unit 520 in the monitoring node 500 receives the heartbeat packet transmitted in step S19. Because, at this time, the time of the heartbeat interval which is indicated in the column "Heartbeat Interval" in the server-status table 511 does not yet elapse since the time indicated in the column "Heartbeat-reception Time" in the server-status table 511, the node monitoring unit 520 recognizes that the server 110 is normally operating. In addition, the node monitoring unit 520 updates with the current time the heartbeat-reception time stored in correspondence with the server 110 in the column "Heartbeat-reception Time" in the server-status table 511.

<Step S21> The node monitoring unit 520 determines whether or not the heartbeat interval indicated in the received heartbeat packet is identical to the heartbeat interval which is indicated in the column "Heartbeat Interval" in the server-status table 511 in correspondence with the server 110. (Although not described in steps S12 and S14, determination as to the identicalness as above is also made every time the monitoring node 500 receives a heartbeat packet.) Since the heartbeat interval indicated in the received heartbeat packet is changed in step S19, the node monitoring unit 520 determines in step S21 that the heartbeat interval indicated in the received heartbeat packet is not identical to the heartbeat interval which is indicated in the column "Heartbeat Interval" in the server-status table 511 in correspondence with the server 110. Therefore, the node monitoring unit 520 updates the interval information indicated in the column "Heartbeat Interval" in the server-status table 511 in correspondence with the server 110, with the heartbeat interval (of 120 seconds) indicated in the received heartbeat packet.

<Step S22> The server 110 in the service provision node 100 continues the execution of the stop routine. For example, the server 110 executes processing for releasing a memory area used by the server 110.

<Step S23> The server 110 stops the operation. That is, one or more processes which operate for realizing one or more functions of the server 110 in accordance with an older version of the application software are stopped.

<Step S24> The updating unit 120 confirms that the operation of the server 110 is stopped. For example, the updating unit 120 confirms that one or more processes which operate for realizing one or more functions of the server 110 are stopped.

<Step S25> The updating unit 120 copies one or more update files (including one or more program files and environment files) which are transmitted together with the update request from the management node 700, into a folder prepared for execution of the software realizing the server 110.

<Step S26> The updating unit 120 issues a start command for the server 110. (Specifically, the updating unit 120 issues to the OS an execution request in which a name (a path and a file name) of a program for realizing the server 110 is designated.)

<Step S27> The OS creates one or more processes realizing the functions of the server 110 in which the software is updated, and the one or more processes start execution of one or more programs indicated in the one or more updated program files. At this time, the server 110 first executes initialization processing, by which, for example, acquisition of a memory area, setting of an operational environment, and the like are realized.

<Step S28> When the processing for starting the operation of the server 110 is completed, the normal operation of the server 110 starts.

<Step S29> The heartbeat transmission unit 112 in the server 110 transmits a heartbeat packet to the monitoring node 500. At this time, the heartbeat packet contains heartbeat interval information, and the heartbeat interval information indicates a default value (ten seconds, in this example) of the heartbeat interval, which is preset.

<Step S30> The node monitoring unit 520 receives the heartbeat packet transmitted in step S29. Because, at this time, the time of the heartbeat interval (120 seconds, in this example) which is indicated in the column "Heartbeat Interval" in the server-status table 511 does not yet elapse since the time indicated in the column "Heartbeat-reception Time" in the server-status table 511, the node monitoring unit 520 recognizes that the server 110 is normally operating. In addition, the node monitoring unit 520 updates with the current time the heartbeat-reception time stored in the column "Heartbeat-reception Time" in the server-status table 511 in correspondence with the server 110.

<Step S31> The node monitoring unit 520 determines whether or not the heartbeat interval indicated in the received heartbeat packet is identical to the heartbeat interval which is indicated in the column "Heartbeat Interval" in the server-status table 511 in correspondence with the server 110. Since the heartbeat interval indicated in the column "Heartbeat Interval" in the server-status table 511 in correspondence with the server 110 is changed in step S21, the node monitoring unit 520 determines in step S31 that the heartbeat interval indicated in the received heartbeat packet is not identical to the heartbeat interval indicated in the column "Heartbeat Interval" in the server-status table 511 in correspondence with the server 110. Therefore, the node monitoring unit 520 updates the interval information in the column "Heartbeat Interval" in the server-status table 511 in correspondence with the server 110, with the heartbeat interval (of 10 seconds) indicated in the received heartbeat packet.

<Step S32> Before 10 seconds elapses since the transmission of the preceding heartbeat packet, the heartbeat transmission unit 112 transmits a heartbeat packet to the monitoring node 500.

<Step S33> The node monitoring unit 520 receives the heartbeat packet transmitted in step S32. Because, at this time, the time of the heartbeat interval (10 seconds, in this example) which is indicated in the column "Heartbeat Interval" in the server-status table 511 does not yet elapse since the time indicated in the column "Heartbeat-reception Time" in the server-status table 511, the node monitoring unit 520 recognizes that the server 110 is normally operating. In addition, the node monitoring unit 520 updates with the current time the heartbeat-reception time stored in the column "Heartbeat-reception Time" in the server-status table 511 in correspondence with the server 110.

As explained above, the heartbeat interval can be temporarily increased when the software of the server 110 is updated. Therefore, it is possible to prevent the temporary stoppage of the server 110 from being detected as a failure. If the temporary stoppage of the server 110 is detected as a failure when the software of the server 110 is updated, the monitoring node 500 performs error processing for the service provision node 100. The error processing includes the processing for excluding the service provision node 100 from a group of nodes as the destinations of processing requests for services. If the service provision node 100 is excluded from the destinations of processing requests for services, the service provision node 100 is required to be added to the group of nodes as the destinations of processing requests for services after the server 110 is restarted. That is, the error processing and the restoration processing can lengthen the duration for which the service provision stops.

When occurrence of an error is prevented by the temporary increase in the heartbeat interval as in the present embodiment, the duration for which the service provision stops is limited to only the time necessary for software updating. Thus, it is possible to minimize the lowering of the operational efficiency of the entire cluster system when the software is updated.

Prevention of Error in Processing Request Node

Hereinbelow, processing for preventing occurrence of an error in the processing request node 600 which transmits a processing request to the service provision node 100 while the software is being updated is explained below. This processing is realized when the updating unit 120 returns a response "Busy" to the processing request indicating that the server 110 is short of resources.

Specifically, after the processing request unit 610 transmits a processing request to the service provision node 100, the processing request unit 610 waits for a response to the processing request. When the processing request unit 610 receives no response even after a predetermined time elapses, the processing request unit 610 performs error processing. In the error processing, for example, the processing request unit 610 transmits an error message to the terminal as the source of the processing request. In order to avoid the error processing, it is necessary to return some response to the processing request within a predetermined time even during the operation for updating the software of the server 110. However, it is impossible to return a processing result when the server 110 is stopped. Therefore, according to the present embodiment, the updating unit 120, on behalf of the server 110, returns a response indicating the shortage of resources. In contrast to the failure in the hardware or software of the server 110, the shortage of resources can be expected to be resolved by waiting a predetermined time. Therefore, when the processing request unit 610 receives the response indicating the shortage of resources, the processing request unit 610 retries the processing request, and performs the error processing when the shortage of resources is not resolved even after the retry is repeated a predetermined number of times. Therefore, in the case where update of the software of the server 110 and restarting of the server 110 are completed while the processing request unit 610 is repeating the retry, it is possible to prevent the processing request node 600 from detecting as an error the stop of the server 110 for the updating.

Figure 8:
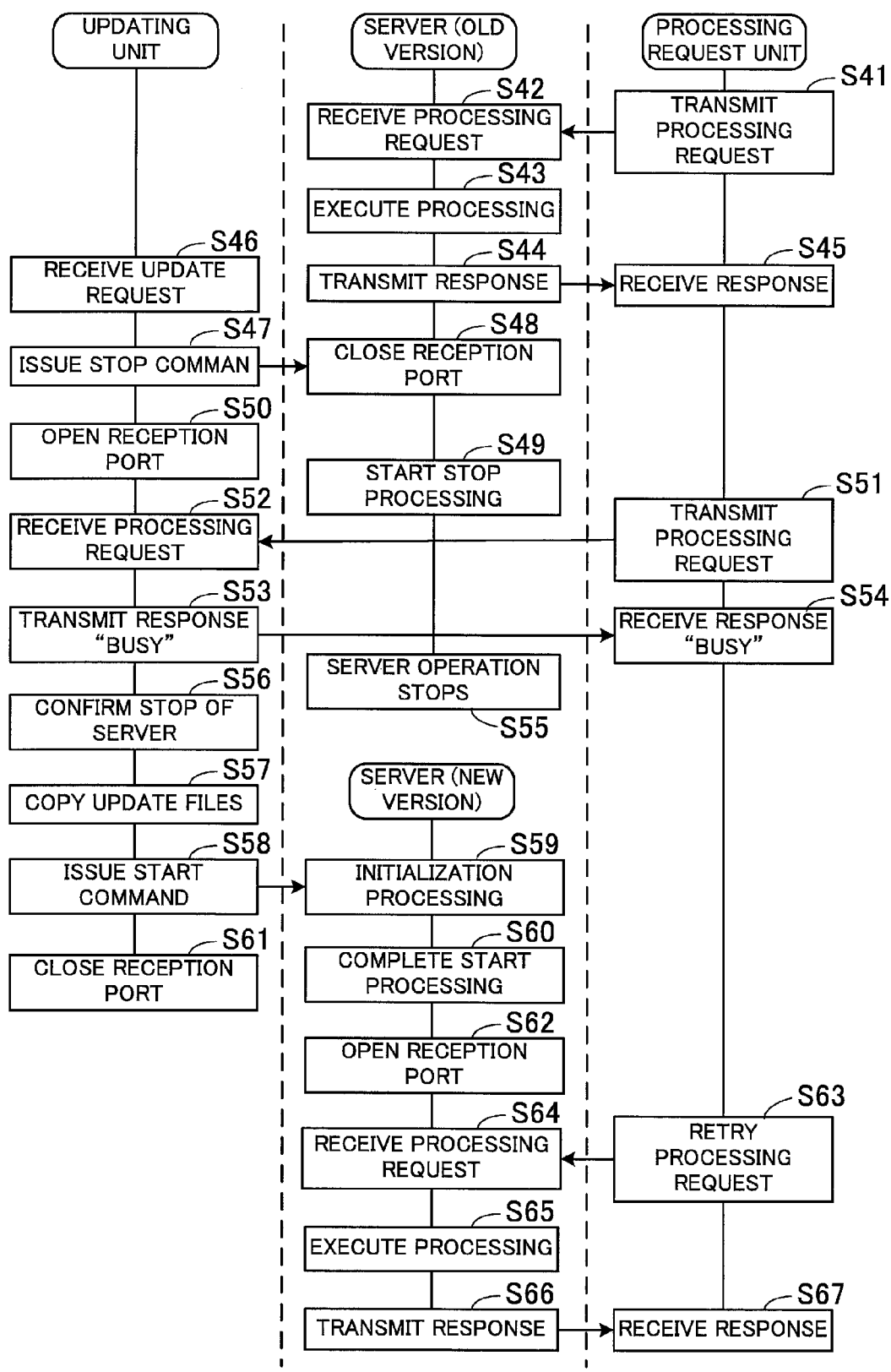
FIG. 8 is a sequence diagram indicating a sequence of processing for making a proxy response while software is being updated.

FIG. 8 is a sequence diagram indicating a sequence of processing for making a proxy response while the software is being updated. The processing of FIG. 8 is explained below step by step.

<Step S41> The processing request unit 610 in the processing request node 600 transmits to the service provision node 100 a processing request which is outputted from a terminal. At this time, a number identifying a port opened by the server 110 is designated as a destination port number in the processing request.

<Step S42> The execution unit 111 in the server 110 receives the processing request.

<Step S43> The execution unit 111 executes processing according to the processing request.

<Step S44> The execution unit 111 transmits to the processing request node 600 the result of the processing in step S43 as a response.

<Step S45> The processing request unit 610 in the processing request node 600 receives the result of the processing, and transmits the result of the processing to the terminal.

<Step S46> The updating unit 120 in the service provision node 100 receives an update request from the management node 700.

<Step S47> The updating unit 120 issues a stop command to the server 110.

<Step S48> The server 110 closes the reception port.

<Step S49> The server 110 starts the stop processing.

<Step S50> The updating unit 120 opens as a reception port of the updating unit 120 the reception port which has been used by the server 110.

<Step S51> The processing request unit 610 in the processing request node 600 transmits to the service provision node 100 a processing request outputted from a terminal. At this time, in the processing request, the number identifying the port which is currently provided by the updating unit 120 and has been previously provided by the server 110 is designated as the destination port number.

<Step S52> The updating unit 120 receives the processing request on behalf of the execution unit 111 in the server 110.

<Step S53> The updating unit 120 transmits to the processing request node 600 a response "Busy" indicating the shortage of resources.

<Step S54> The processing request unit 610 in the processing request node 600 receives the response "Busy" indicating the shortage of resources. Therefore, the processing request unit 610 recognizes that the server 110 cannot execute the processing because of the shortage of resources.

<Step S55> The server 110 in the service provision node 100 stops the operation. That is, the one or more processes realizing the functions of the server 110 in accordance with an older version of the software are stopped.

<Step S56> The updating unit 120 in the service provision node 100 confirms that the server 110 is stopped. For example, the updating unit 120 confirms that the one or more processes realizing the functions of the server 110 are stopped.

<Step S57> The updating unit 120 copies one or more update files (including one or more program files and environment files) which are transmitted together with the update request from the management node 700, into a folder prepared for execution of the software realizing the server 110.

<Step S58> The updating unit 120 issues a start command for the server 110. (Specifically, the updating unit 120 issues to the OS an execution request in which a name (a path and a file name) of a program for realizing the server 110 is designated.)

<Step S59> The OS creates one or more processes realizing the functions of the server 110 in which the software is updated, and the one or more processes start execution of one or more programs indicated in the one or more updated program files. At this time, the server 110 first executes initialization processing, by which, for example, acquisition of a memory area, setting of an operational environment, and the like are realized.

<Step S60> When the processing for starting the operation of the server 110 is completed, the normal operation of the server 110 starts.

<Step S61> The updating unit 120 in the service provision node 100 closes the reception port opened in step S50.

<Step S62> The server 110 opens a reception port.

<Step S63> The processing request unit 610 in the processing request node 600 retries the processing request, i.e., transmits again to the service provision node 100 the processing request outputted from the terminal.

<Step S64> The execution unit 111 in the server 110 receives the processing request.

<Step S65> The execution unit 111 executes processing according to the processing request.

<Step S66> The execution unit 111 transmits to the processing request node 600 the result of the processing in step S65 as a response.

<Step S67> The processing request unit 610 in the processing request node 600 receives the result of the processing, and transmits the result of the processing to the terminal.

As explained above, it is possible to update the software for realizing the server 110 in the service provision node 100 without detecting an error in the processing request node 600, which transmits the processing request to the service provision node 100.

Operations of Updating Unit

Figure 9:
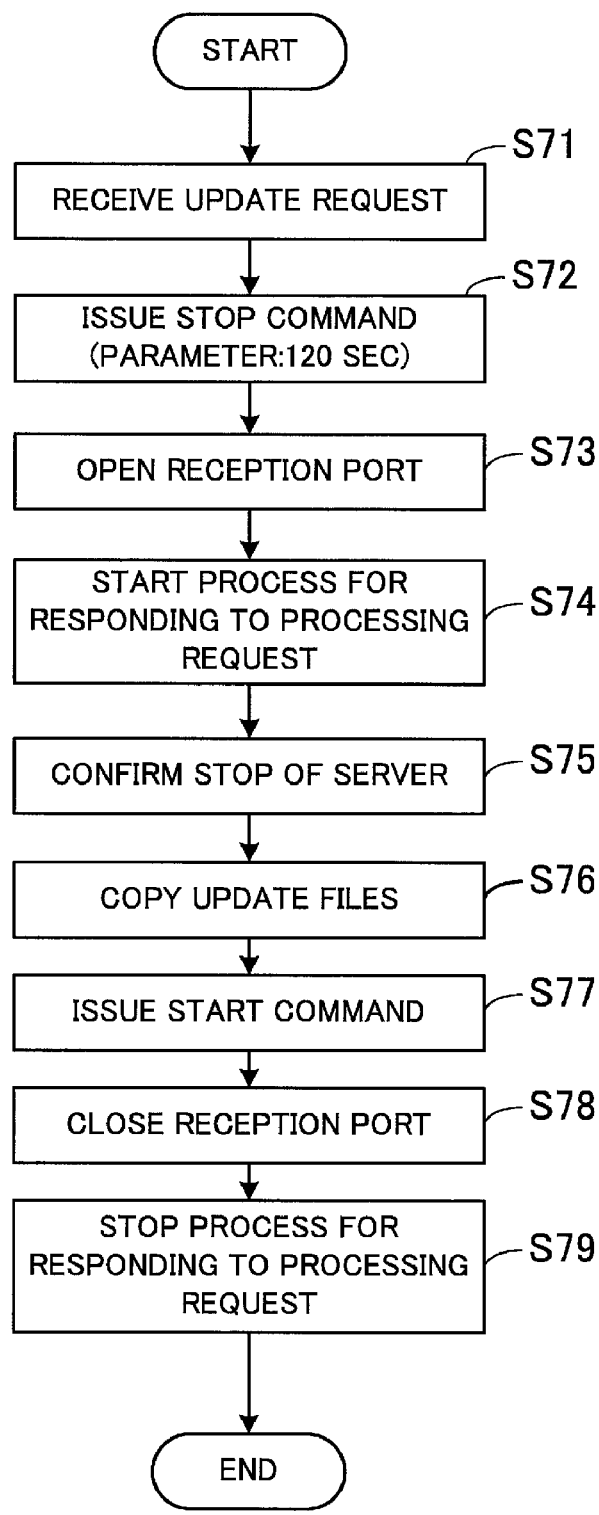
FIG. 9 is a flow diagram indicating a sequence of processing performed by an updating unit.

The operations performed by the updating unit 120 are extracted from the operations indicated in FIGS. 7 and 8, and summarized in a flow diagram of FIG. 9. The processing of FIG. 9 is explained below step by step.

<Step S71> The updating unit 120 in the service provision node 100 receives an update request from the management node 700.

<Step S72> The updating unit 120 issues a stop command to the server 110, to which a parameter instructing to increase the heartbeat interval is attached. In the example of FIG. 7, it is assumed that the parameter instructs to increase the heartbeat interval to 120 seconds.

<Step S73> The updating unit 120 opens as a reception port of the updating unit 120 the reception port which has been used by the server 110.

<Step S74> The updating unit 120 starts a process for responding to a processing request. The started process returns a response "Busy" to the processing request in parallel processing as explained later with reference to FIG. 10.

<Step S75> The updating unit 120 in the service provision node 100 confirms that the server 110 is stopped. For example, the updating unit 120 confirms that the one or more processes realizing the functions of the server 110 are stopped.

<Step S76> The updating unit 120 copies one or more update files (including one or more program files and environment files) which are transmitted together with the update request from the management node 700, into a folder prepared for execution of the software realizing the server 110.

<Step S77> The updating unit 120 issues a start command for the server 110.

<Step S78> The updating unit 120 closes the reception port opened in step S73.

<Step S79> The updating unit 120 stops the process for responding to a processing request. Thereafter, the processing of FIG. 9 is completed.

Figure 10:
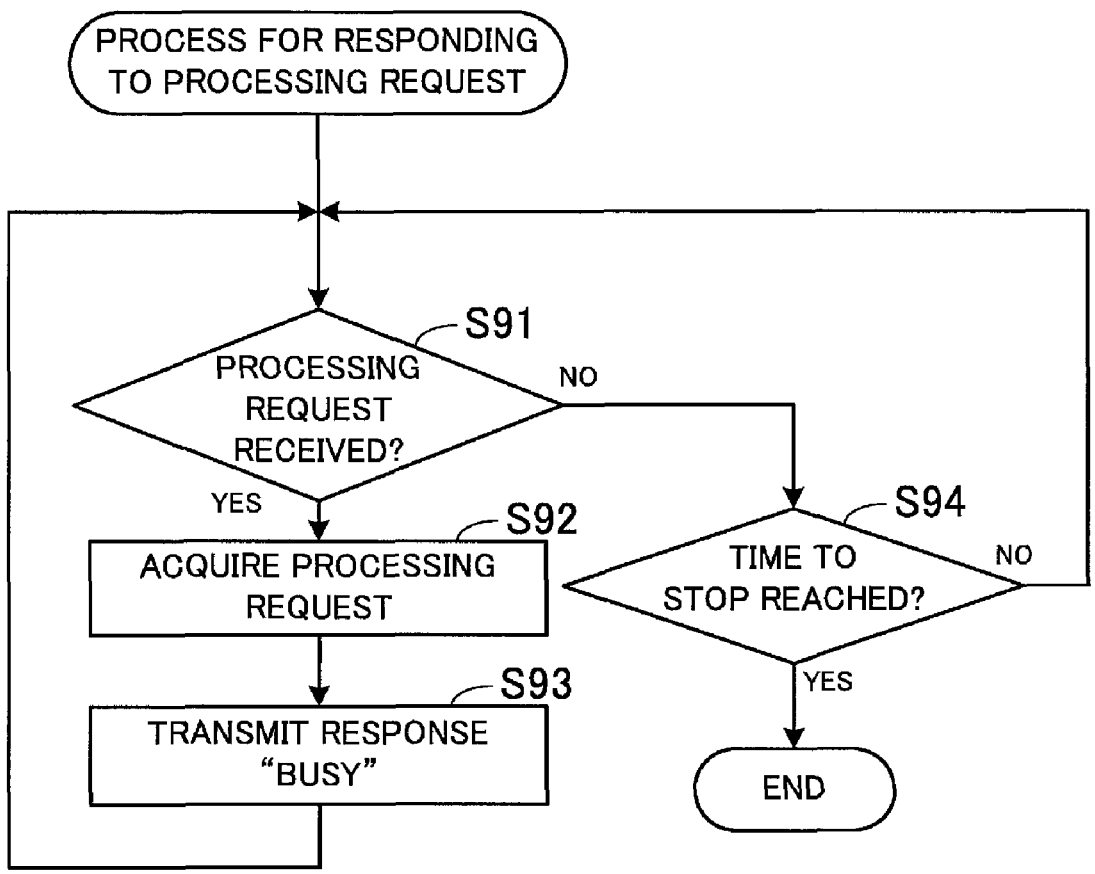
FIG. 10 is a flow diagram indicating a sequence of a process for responding to a processing request.

FIG. 10 is a flow diagram indicating a sequence of the process for responding to a processing request. The processing of FIG. 10 is explained below step by step.

<Step S91> The updating unit 120 determines whether or not the service provision node 100 receives a processing request. When yes is determined, the operation goes to step S92. When no is determined, the operation goes to step S94.

<Step S92> The updating unit 120 acquires the processing request.

<Step S93> The updating unit 120 transmits a message "Busy" indicating the shortage of resources as a response to the processing request. Thereafter, the operation goes to step S91.

<Step S94> The updating unit 120 determines whether or not the time to stop the process for responding to a processing request is reached (i.e., whether or not the operation goes to step S79 in FIG. 9). When no is determined, the operation goes to step S91. When yes is determined, the process for responding to a processing request is stopped.

Operations of Node Monitoring Unit

Next, processing performed by the node monitoring unit 520 is explained in detail below. The processing performed by the node monitoring unit 520 includes processing for acquiring the heartbeat interval information and processing for monitoring the status.

Figure 11:
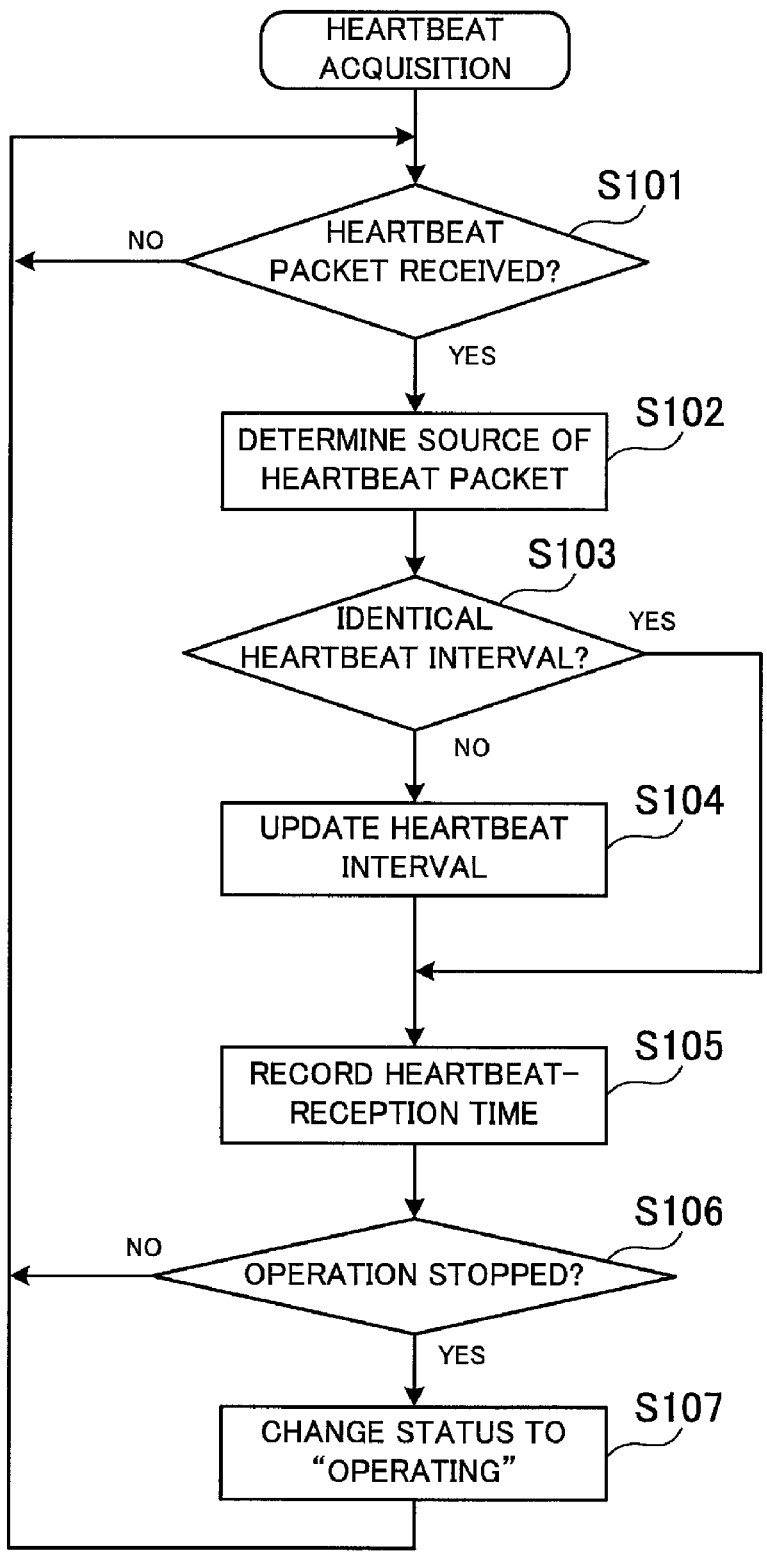
FIG. 11 is a flow diagram indicating a sequence of processing for acquiring heartbeat interval information by a node monitoring unit.

FIG. 11 is a flow diagram indicating a sequence of the processing for acquiring the heartbeat interval information performed by the node monitoring unit 520. The processing of FIG. 11 is explained below step by step.

<Step S101> The node monitoring unit 520 determines whether or not the monitoring node 500 receives a heartbeat packet. When yes is determined, the operation goes to step S102. When no is determined, the operation in step S101 is repeated.

<Step S102> The node monitoring unit 520 acquires the address and the application-identification number of the service provision node as the source of the received heartbeat packet, and refers to a record in the server-status table 511 corresponding to the acquired address and application-identification number.

<Step S103> The node monitoring unit 520 determines whether or not the heartbeat interval indicated in the record referred to is identical to the heartbeat interval indicated by the heartbeat interval information contained in the received heartbeat packet. When yes is determined, the operation goes to step S105. When no is determined, the operation goes to step S104.

<Step S104> The node monitoring unit 520 changes the heartbeat interval in the server-status table 511. (Specifically, the node monitoring unit 520 records the heartbeat interval indicated by the heartbeat interval information contained in the received heartbeat packet, in the column "Heartbeat Interval" in the record referred to.)

<Step S105> The node monitoring unit 520 records the current time in the column "Heartbeat-reception Time" in the record referred to.

<Step S106> The node monitoring unit 520 determines whether or not the status stored in the record referred to indicates that the operation of the corresponding server is stopped. When yes is determined, the operation goes to step S107. When no is determined, the operation goes to step S101.

<Step S107> The node monitoring unit 520 changes the status stored in the record referred to, to the operating state and thereafter the operation goes to step S101.

Figure 12:
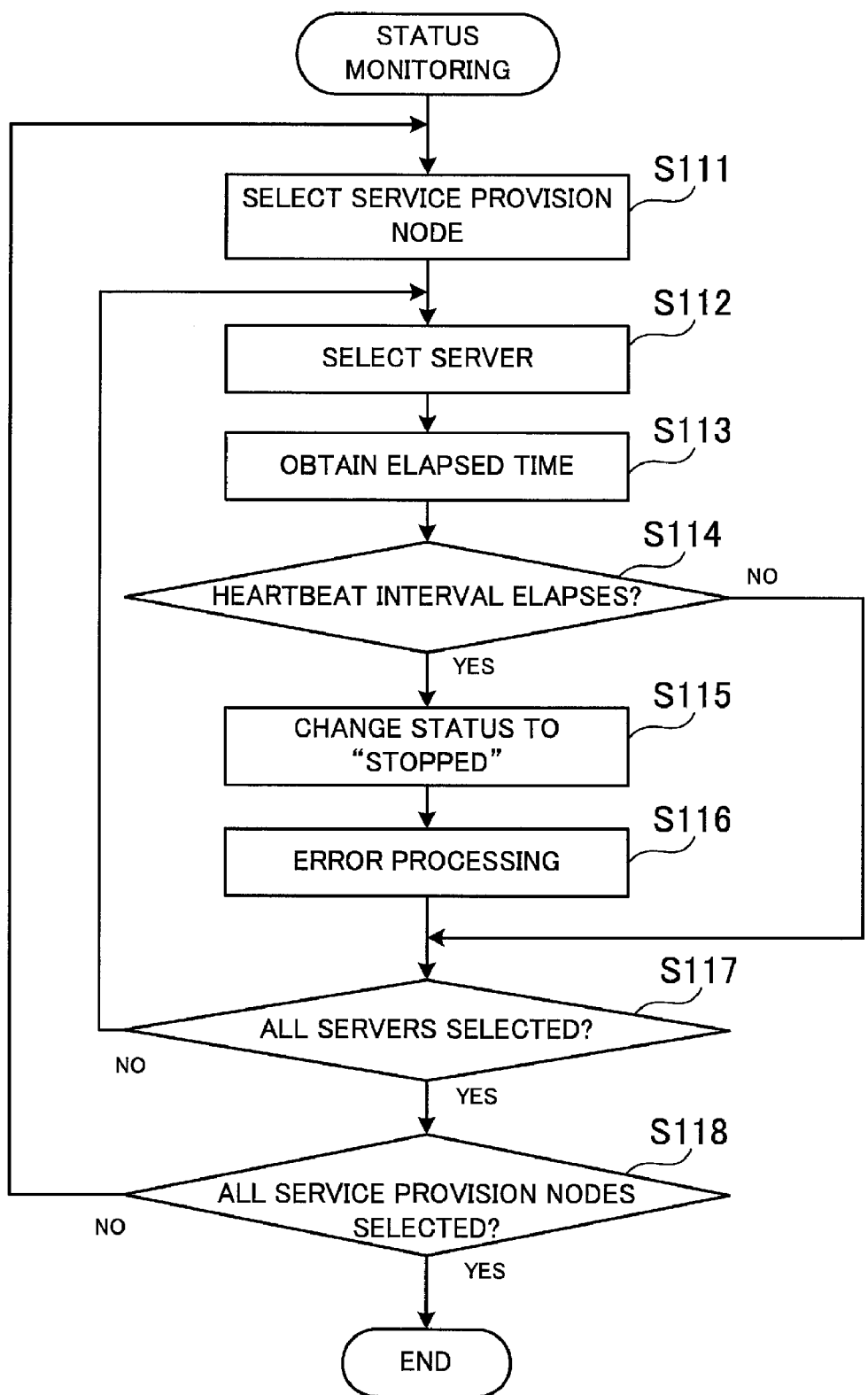
FIG. 12 is a flow diagram indicating a sequence of processing for monitoring the status by the node monitoring unit.

FIG. 12 is a flow diagram indicating a sequence of the processing for monitoring the status by the node monitoring unit 520. The processing of FIG. 12 is periodically performed at predetermined intervals, and is explained below step by step.

<Step S111> The node monitoring unit 520 selects one of the service provision nodes. (Specifically, the node monitoring unit 520 selects one of the addresses of the service provision nodes indicated in the server-status table 511.)

<Step S112> The node monitoring unit 520 selects one of one or more servers operating in the service provision nodes. (Specifically, the node monitoring unit 520 selects one of one or more application-identification numbers of the selected one of the service provision nodes in the server-status table 511.)

<Step S113> The node monitoring unit 520 calculates the time which elapses since the heartbeat-reception time. (Specifically, the node monitoring unit 520 obtains the difference between the current time and the heartbeat-reception time stored in the server-status table 511 in correspondence with the application-identification number selected in step S112.)

<Step S114> The node monitoring unit 520 determines whether or not the elapsed time obtained in step S113 reaches the heartbeat interval stored in the server-status table 511 in correspondence with the application-identification number selected in step S112. (Specifically, the node monitoring unit 520 compares the elapsed time obtained in step S113 with the heartbeat interval stored in the server-status table 511 in correspondence with the application-identification number selected in step S112.) When the elapsed time is greater, by a predetermined delay tolerance or more, than the heartbeat interval stored in the server-status table 511, the node monitoring unit 520 determines that the elapsed time obtained in step S113 reaches the heartbeat interval stored in the server-status table 511 in correspondence with the application-identification number selected in step S112. For example, in the case where the delay tolerance is 10% of the heartbeat interval, when the elapsed time obtained in step S113 is greater than 1.1 times the heartbeat interval stored in the server-status table 511, the node monitoring unit 520 determines that the elapsed time obtained in step S113 reaches the heartbeat interval stored in the server-status table 511. When the elapsed time obtained in step S113 is determined to reach the heartbeat interval stored in the server-status table 511, the operation goes to step S115. When the elapsed time obtained in step S113 is determined not to reach the heartbeat interval stored in the server-status table 511, the operation goes to step S117.

<Step S115> When the elapsed time obtained in step S113 is determined to reach the heartbeat interval stored in the server-status table 511, the node monitoring unit 520 changes the status of the selected server to the stopped state. (Specifically, the node monitoring unit 520 changes the indication in the column "Status" in the server-status table 511 in correspondence with the selected application-identification number, to "ERROR.")

<Step S116> The node monitoring unit 520 performs error processing. For example, the node monitoring unit 520 transmits to the processing request node 600 a command to exclude the selected service provision node from the candidates for one or more destinations of the processing request. When the processing request node 600 receives the above command, the processing request unit 610 in the processing request node 600 excludes the selected service provision node from the candidates for the one or more destinations of the processing request.

<Step S117> The node monitoring unit 520 determines whether or not all of the one or more servers in the selected service provision node have already been selected. (Specifically, the node monitoring unit 520 determines whether or not the operations in steps S113 to S116 are completed for all of the one or more application-identification numbers corresponding to the service provision node selected in step S111.) When yes is determined, the operation goes to step S118. When no is determined, the operation goes to step S112.

<Step S118> The node monitoring unit 520 determines whether or not all of the service provision nodes have already been selected. (Specifically, the node monitoring unit 520 determines whether or not all of the addresses of the service provision nodes indicated in the server-status table 511 have already been selected.) When yes is determined, the processing of FIG. 12 is completed. When no is determined, the operation goes to step S111.

Relay Processing

Figure 13:
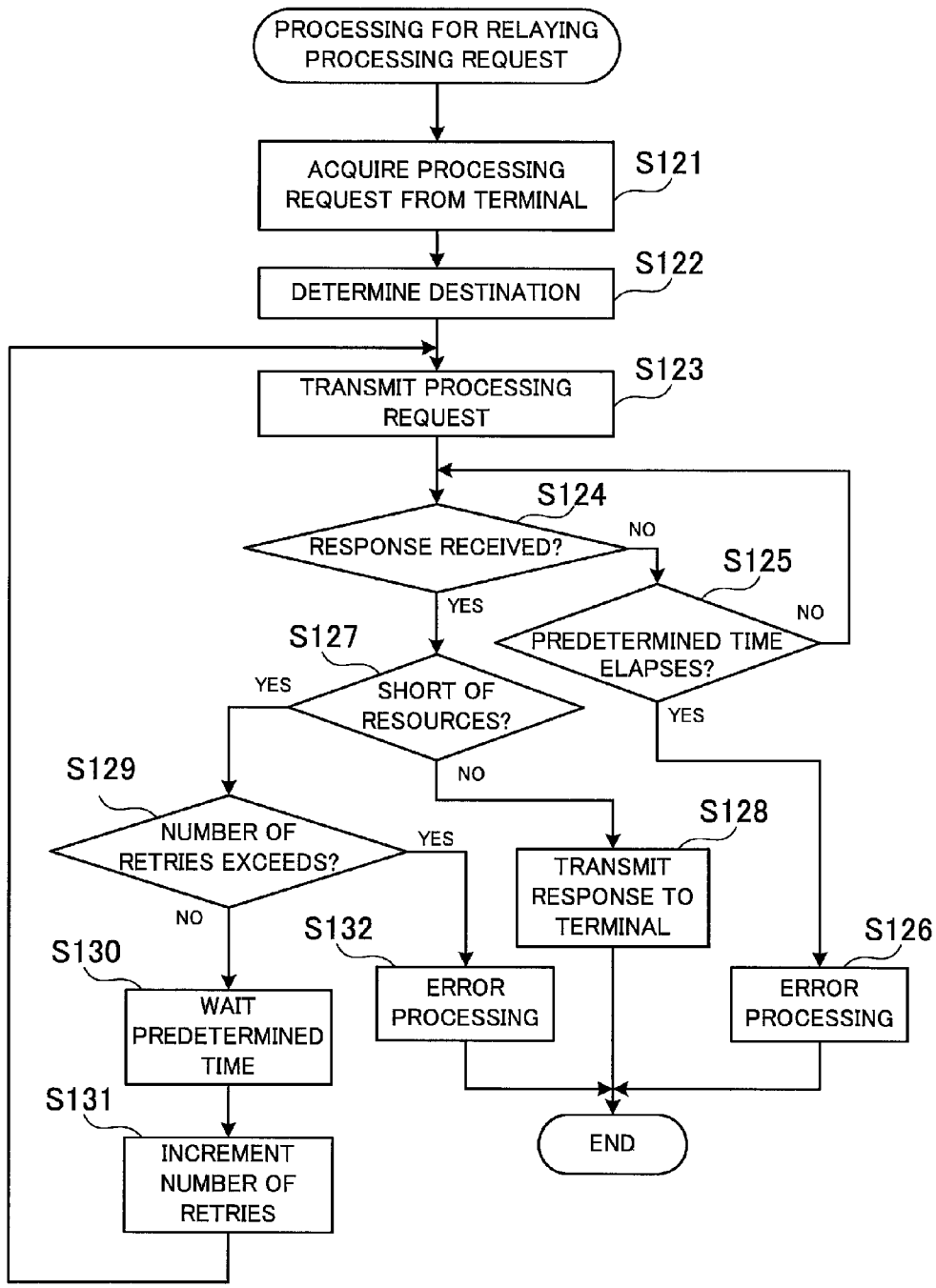
FIG. 13 is a flow diagram indicating a sequence of processing for relaying a processing request.

Next, relay processing performed by the processing request unit 610 for relaying a processing request outputted from a terminal is explained in detail below. FIG. 13 is a flow diagram indicating a sequence of the processing for relaying a processing request outputted from a terminal when the processing request node 600 receives the processing request from the terminal. The processing of FIG. 13 is explained below step by step.

<Step S121> The processing request unit 610 acquires the processing request from the terminal.

<Step S122> The processing request unit 610 determines a service provision node as the destination of the processing request. For example, the processing request unit 610 chooses as the destination a service provision node on which relatively light load is imposed.

<Step S123> The processing request unit 610 transmits the processing request (received from the terminal) to the service provision node determined in step S122.

<Step S124> The processing request unit 610 determines whether or not the processing request node 600 receives a response from the service provision node. When yes is determined, the operation goes to step S127. When no is determined, the operation goes to step S125.

<Step S125> The processing request unit 610 determines whether or not a predetermined time elapses, without reception of a response, since the transmission of the processing request to the service provision node. When yes is determined, the operation goes to step S126. When no is determined, the operation goes to step S124.

<Step S126> The processing request unit 610 performs error processing. For example, the processing request unit 610 transmits an error message to the terminal which outputs the processing request, and thereafter the processing of FIG. 13 is completed.

<Step S127> The processing request unit 610 determines whether or not the received response is a response "Busy" indicating shortage of resources. When yes is determined, the operation goes to step S129. When no is determined, the operation goes to step S128.

<Step S128> The processing request unit 610 transmits to the terminal the response to the terminal which outputs the processing request, and thereafter the processing of FIG. 13 is completed.

<Step S129> The processing request unit 610 determines whether or not the number of retries exceeds a predetermined number. The number of retries is determined on the basis of a count obtained by a retry-number counter, which is initialized to zero when the processing request node 600 receives the processing request. When yes is determined, the operation goes to step S132. When no is determined, the operation goes to step S130.

<Step S130> The processing request unit 610 waits a predetermined time.

<Step S131> The processing request unit 610 increments the retry-number counter by one, and the operation goes to step S123.

<Step S132> When the number of retries exceeds a predetermined number, the processing request unit 610 performs error processing (e.g., transmits an error message to the terminal which outputs the processing request). Thereafter, the processing of FIG. 13 is completed.

Advantage

According to the explained embodiment, the software of the server can be updated without causing an error. Therefore, the lowering of the operational efficiency of the cluster system, which can occur when the software is updated, can be minimized.

For example, in the case where a service provision node operates as a storage server, if the operation of the storage server stops, all data managed by the storage server are required to be reproduced in one or more other storage servers. For example, in the case where mirroring is performed by use of a plurality of storage servers, if one of the storage servers continuously stops, the system reliability deteriorates. Therefore, it is necessary to copy massive data managed by a normally operating storage server into another storage server which forms a mirroring pair with the normally operating storage server. However, if massive data is copied only for simple updating of software, network load increases and the operational efficiency of the system is seriously lowered. On the other hand, according to the explained embodiment, it is possible to prevent occurrence of an error when software is updated, and therefore minimize the lowering of the operational efficiency.

Variations

Although the transmission intervals of the heartbeat packets are increased in order to prevent occurrence of an error in the monitoring node 500 according to the explained embodiment, alternatively, it is also possible to prevent occurrence of an error in the monitoring node 500 by transmitting the heartbeat packets from the updating unit 120, instead of the server 110. In this case, the updating unit 120 transmits the heartbeat packets 30 to the monitoring node 500 at predetermined intervals (of, for example, 10 seconds) after the reception port is opened in step S50 (in FIG. 8) until the reception port is closed in step S61 (in FIG. 8). At this time, the updating unit 120 sets the identification number of the server 110 in the field of the application-identification number in the heartbeat packet 30, so that the monitoring node 500 can recognize that the heartbeat packet 30 are outputted from the server 110. Therefore, in this case, it is unnecessary to perform the operation in step S19 (in FIG. 7) for transmitting the heartbeat packet at the increased heartbeat interval (of, for example, 120 seconds).

Although the software is updated after the operation of the server 110 is stopped according to the explained embodiment, in some cases, new software can be installed while the server 110 is in operation. For example, in the case where the object of which the processing is requested is determined by only a port number and does not depend on the file name of the executable file, new software can be installed by use of a different file name. In this case, it is possible to concurrently start an older version of software and a newer version of the software. Therefore, it is possible to update the software without causing an error by making a server realized by the newer version of the software inherit a communication port from a server realized by the older version of the software. In order to realize the inheritance of the communication port, the server realized by the newer version of the software repeatedly performs processing for opening a port until the server realized by the older version of the software closes the port. When the server realized by the older version of the software stops, the port used by the server realized by the older version of the software is closed. Thereafter, the server realized by the newer version of the software succeeds in opening of the port. Then, the server realized by the newer version of the software performs processing according to a processing request, and periodically transmits heartbeat packets.

The inheritance of the communication port is necessary for enabling use of a communication port by both of the server realized by the older version of the software and the server realized by the newer version of the software. Therefore, the inheritance of the communication port is unnecessary in the case where the port number used after the updating of the software is different from the port number used before the updating of the software. However, in such a case, the cluster system is required to be arranged so that a processing request received by the server before the updating of the software is passed to the server after the updating of the software. For example, in services using the RPC (Remote Procedure Call) protocol provided by Sun Microsystems, Inc., a service name and a version number are registered in the portmapper, and the server as the destination of the processing request can be changed. Specifically, the new server after the update of the software is registered by the same service name as the old server before the update of the software and a version number different from the old server. When communication with a server before software update becomes impossible, the other functions in the cluster system (for example, the processing request unit 610) retakes a port number corresponding to the same IP address and a new version number for the service provided by the server. (For example, a rule for setting the version numbers is predetermined, for example, so that the version number increases every time a new version is registered in the portmapper.) Since the version number is explicitly recognized according to the above technique, it is also possible to update a protocol as well as the software. Further, it is possible to concurrently update the software in all the nodes.

Recording Medium Storing Program

The processing functions according to the embodiment explained above are realized by computers. In this case, a program describing details of processing for realizing the functions which each of the service provision nodes and the monitoring nodes should have is provided. When a computer executes the program, the processing functions of one of the service provision nodes and the monitoring nodes can be realized on the computer.

The program describing the details of the processing can be stored in a recording medium which can be read by the computer. The recording medium may be a magnetic recording device, an optical disk, an optical magnetic recording medium, a semiconductor memory, or the like. The magnetic recording device may be a hard disk drive (HDD), a flexible disk (FD), a magnetic tape (MT), or the like. The optical disk may be a DVD (Digital Versatile Disk), a DVD-RAM (Random Access Memory), a CD-ROM (Compact Disk-Read Only Memory), a CD-R (Recordable)/RW (ReWritable), or the like. The optical magnetic recording medium may be an MO (Magneto-Optical Disk) or the like.

In order to put each program into the market, for example, it is possible to sell a portable recording medium such as a DVD or a CD-ROM in which the program is recorded. Alternatively, it is possible to store the program in a storage device belonging to a server computer, and transfer the program to another computer through a network.

The computer which should execute the program stores the program in a storage device belonging to the computer, where the program is originally recorded in, for example, a portable recording medium, or is initially transferred from the server computer. The computer reads the program from the storage device, and performs processing in accordance with the program. Alternatively, the computer may directly read the program from the portable recording medium for performing processing in accordance with the program. Further alternatively, the computer can sequentially execute processing in accordance with each portion of the program every time the portion of the program is transferred from the server computer.

Additional Matters

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that various changes, substitutions and alterations could be made hereto without departing from the spirit and scope of the invention.

What is claimed is:

1. A cluster system performing distributed processing by use of a plurality of servers, comprising a service provision node and a monitoring node;

said service provision node includes,
an execution unit which executes processing according to a processing request when the service provision node receives the processing request, and stops operation of the execution unit when the execution unit receives a command to stop the execution unit, and
a heartbeat transmission unit which periodically transmits first heartbeat packets containing interval information to the monitoring node at first intervals when the execution unit is in operation, transmits a second heartbeat packet containing interval information to the monitoring node when the heartbeat transmission unit receives the command to stop the execution unit, and restarts periodical transmission of the first heartbeat packets when the execution unit is restarted, where the interval information contained in the first heartbeat packets indicates the first intervals, and the interval information contained in the second heartbeat packet indicates a second interval greater than the first intervals; and said monitoring node includes,
an interval storage which stores in correspondence with the service provision node the interval information contained in the first heartbeat packets or the second heartbeat packet,
an interval updating unit which receives each of the first heartbeat packets and the second heartbeat packet transmitted from the service provision node, and updates the interval information stored in the interval storage in correspondence with the service provision node, with the interval information contained in said each of the first heartbeat packets and the second heartbeat when the interval information contained in said each of the first heartbeat packets and the second heartbeat is different from the interval information stored in the interval storage in correspondence with the service provision node, and
a heartbeat monitoring unit which determines that the execution unit is in operation, while the monitoring node receives said first heartbeat packets and said second heartbeat packet at intervals indicated by the interval information stored in the interval storage in correspondence with the service provision node.

2. The cluster system according to claim 1, wherein said second interval is designated in said command to stop the execution unit.

3. The cluster system according to claim 1, wherein said service provision node further comprises an updating unit which outputs said command to stop the execution unit when the service provision node receives a request to update software for realizing the execution unit, updates the software in accordance with the request, and restarts the execution unit by use of the updated software.

4. The cluster system according to claim 3, wherein said updating unit opens a reception port having a port number after the execution unit closes a reception port having an identical port number, and transmits to a computer a response indicating shortage of resources when the service provision node receives from the computer a processing request directed to the opened reception port.

5. The cluster system according to claim 3, wherein a predetermined time is designated as said second interval in said command by the updating unit, and said heartbeat transmission unit inserts into the second heartbeat packet the interval information which indicates the second heartbeat interval equal to the predetermined time.

6. A process for updating software in a cluster system which performs distributed processing by use of a plurality of servers and includes a monitoring node and a service provision node in which an execution unit is realized by said software so that the execution unit executes processing according to a processing request on receipt of the processing request, comprising:
realizing in said service provision node a heartbeat transmission unit and an updating unit, and realizing in said monitoring node a interval updating unit, a heartbeat monitoring unit, and an interval storage which stores interval information in correspondence with said service provision node;
periodically transmitting, by the heartbeat transmission unit, first heartbeat packets containing interval information from said service provision node to said monitoring node at first intervals while the execution unit is in operation, where the interval information contained in the first heartbeat packets indicates the first intervals;
outputting a command to stop the execution unit from said updating unit to said execution unit when said service provision node receives a request to update said software;
transmitting, by the heartbeat transmission unit, a second heartbeat packet containing interval information from said service provision node to said monitoring node when the heartbeat transmission unit receives the command to stop the execution unit, where the interval information contained in the second heartbeat packet indicates a second interval greater than the first intervals;
receiving, by said interval updating unit, said second heartbeat packet from said service provision node, and then updating, by said interval updating unit, the interval information stored in said interval storage in correspondence with the service provision node, with said interval information contained in the received second heartbeat packet;
stopping operation of said execution unit in response to said command to stop the execution unit;
updating said software by said updating unit in accordance with said request to update the software, and thereafter restarting the execution unit realized by the updated software;
periodically transmitting, by the heartbeat transmission unit, the first heartbeat packets from said service provision node to said monitoring node at the first intervals when the execution unit is restarted;
receiving, by said interval updating unit, said first heartbeat packets from said service provision node after the execution unit is restarted, and then updating, by said interval updating unit, the interval information stored in said interval storage in correspondence with the service provision node, with the interval information contained in one of the first heartbeat packets transmitted after the execution unit is restarted; and
determining, by said heartbeat monitoring unit, that said execution unit is in operation, while said monitoring node receives heartbeat packets at intervals indicated by the interval information stored in said interval storage in correspondence with the service provision node.

7. A service provision node constituting a cluster system which performs distributed processing, comprising:
an execution unit which executes processing according to a processing request when the service provision node receives the processing request, and stops operation of the execution unit when the execution unit receives a command to stop the execution unit; and a heartbeat transmission unit which periodically transmits first heartbeat packets containing interval information to the monitoring node at first intervals when the execution unit is in operation, transmits a second heartbeat packet containing interval information to the monitoring node when the heartbeat transmission unit receives the command to stop the execution unit, and restarts periodical transmission of the first heartbeat packets when the execution unit is restarted, where the interval information contained in the first heartbeat packets indicates the first intervals, and the interval information contained in the second heartbeat packet indicates a second interval greater than the first intervals.

8. A non-transitory computer-readable medium which stores a service-provision program to be executed by a computer constituting a cluster system which performs distributed processing, said service-provision program realizes in the computer:

an execution unit which executes processing according to a processing request when the service provision node receives the processing request, and stops operation of the execution unit when the execution unit receives a command to stop the execution unit; and a heartbeat transmission unit which periodically transmits first heartbeat packets containing interval information to the monitoring node at first intervals when the execution unit is in operation, transmits a second heartbeat packet containing interval information to the monitoring node when the heartbeat transmission unit receives the command to stop the execution unit, and restarts periodical transmission of the first heartbeat packets when the execution unit is restarted, where the interval information contained in the first heartbeat packets indicates the first intervals, and the interval information contained in the second heartbeat packet indicates a second interval greater than the first intervals.

\* \* \* \* \*